United States Patent
Almy et al.

(10) Patent No.: US 10,340,839 B2
(45) Date of Patent: Jul. 2, 2019

(54) DYNAMIC DAMPING SYSTEM FOR SOLAR TRACKERS

(71) Applicant: SolarCity Corporation, San Mateo, CA (US)

(72) Inventors: Charles Almy, Berkeley, CA (US); Soren Jensen, Corte Madera, CA (US)

(73) Assignee: SolarCity Corporation, San Mateo, CA (US)

( * ) Notice: Subject to any disclaimer, the term of this patent is extended or adjusted under 35 U.S.C. 154(b) by 380 days.

(21) Appl. No.: 14/979,258

(22) Filed: Dec. 22, 2015

(65) Prior Publication Data

US 2017/0179872 A1   Jun. 22, 2017

(51) Int. Cl.
| | |
|---|---|
| F24S 30/00 | (2018.01) |
| F24S 50/20 | (2018.01) |
| H02S 20/32 | (2014.01) |
| F24S 30/425 | (2018.01) |

(52) U.S. Cl.
CPC ............ *H02S 20/32* (2014.12); *F24S 30/425* (2018.05); *F24S 50/20* (2018.05); *F24S 2030/19* (2018.05); *Y02E 10/47* (2013.01)

(58) Field of Classification Search
None
See application file for complete search history.

(56) References Cited

U.S. PATENT DOCUMENTS

| | | |
|---|---|---|
| 4,103,151 A | 7/1978 | Chromie |
| 4,328,789 A | 5/1982 | Nelson |
| 4,445,030 A | 4/1984 | Carlton |
| 6,042,060 A | 3/2000 | Sargis |
| 6,058,930 A | 5/2000 | Shingleton |
| 6,123,067 A | 9/2000 | Warrick |
| 7,503,431 B2 | 3/2009 | Sperber et al. |
| 8,119,963 B2 | 2/2012 | Scanlon |
| 8,178,775 B2 | 5/2012 | Taylor, II et al. |

(Continued)

FOREIGN PATENT DOCUMENTS

| | | |
|---|---|---|
| EP | 2000750 A2 | 12/2008 |
| EP | 2489961 A1 | 8/2012 |

(Continued)

OTHER PUBLICATIONS

Zhang et al., "Dynamic analysis of deployable solar panel", Yuhang Xuebao/Journal of Astronautics vol. 30, No. 4, Jul. 2009, pp. 1359-1364.

(Continued)

*Primary Examiner* — Shannon M Gardner
(74) *Attorney, Agent, or Firm* — Kilpatrick Townsend & Stockton LLP (57) ABSTRACT

A solar-tracking photovoltaic array is described. The photovoltaic array includes mounting hardware configured to rotate photovoltaic modules associated with the photovoltaic array about one or more axes. In some embodiments, the photovoltaic modules can be coupled to a torque tube oriented in a substantially North-South direction. An orientation motor can then periodically rotate the torque tube in a manner that causes the photovoltaic modules to be oriented towards the sun. The orientation motor can also be utilized to apply short pulses to the torque tube that dampen oscillations caused by wind buffeting the photovoltaic modules.

8 Claims, 11 Drawing Sheets

(56) References Cited

U.S. PATENT DOCUMENTS

| | | |
|---|---|---|
| 8,273,978 B2 | 9/2012 | Thompson et al. |
| 8,389,918 B2 | 3/2013 | Oosting et al. |
| 8,459,249 B2 | 6/2013 | Corio |
| 8,587,775 B1 | 11/2013 | Wilson et al. |
| 8,671,931 B2 | 3/2014 | Curtis et al. |
| 8,692,173 B2 | 4/2014 | Altaii et al. |
| 8,973,570 B2 | 3/2015 | Stavrou et al. |
| 2010/0263659 A9 | 10/2010 | Taylor et al. |
| 2011/0041834 A1 | 2/2011 | Liao |
| 2011/0067750 A1 | 3/2011 | Ueda |
| 2011/0114079 A1 | 5/2011 | Heckendorn |
| 2011/0308512 A1 | 12/2011 | Nakasato et al. |
| 2012/0216852 A1 | 8/2012 | Almy et al. |
| 2012/0318325 A1 | 12/2012 | Liu |
| 2014/0182577 A1 | 7/2014 | Linderman et al. |
| 2014/0230804 A1 | 8/2014 | Siddiqui et al. |
| 2017/0163208 A1* | 6/2017 | Almy .................. H02S 20/32 |

FOREIGN PATENT DOCUMENTS

| | | |
|---|---|---|
| WO | 2010/083866 A2 | 7/2010 |
| WO | 2011116449 A1 | 9/2011 |
| WO | 2013057332 A1 | 4/2013 |

OTHER PUBLICATIONS

Hanieh, Solar Photovoltaic Panels Tracking System, Proceedings of the WSEAS 6th International Conference on Dynamical Systems and Control (Control 2010), Advances in Dynamical Systems and Control, 2010, pp. 30-37, WSEAS Press.

Engin et al., Optimization mechatronic sun tracking system controller's for improving performance, 2013, pp. 1108-1112, IEEE Computer Society, Washington, DC, USA.

U.S. Appl. No. 14/981,746, "Non-Final Office Action", dated Feb. 23, 2018, 10 pages.

* cited by examiner

DYNAMIC DAMPING SYSTEM FOR SOLAR TRACKERS

FIELD

The described embodiments relate to solar-tracking systems. In particular, control systems for ameliorating oscillatory motion of the solar-tracking systems are discussed.

BACKGROUND

Photovoltaic modules generate the most electricity when oriented directly towards the sun. Unfortunately, the moving parts required to keep the photovoltaic modules oriented towards the sun tend to make the support structures associated with the photovoltaic modules substantially more susceptible to wind damage. This due in part to the standard geometry of a tracking system whereby a series of PV modules are mounted in a row along a rotating north-south axis known as a torque tube. As many as 20 or 30 modules may be attached along the length of a single torque tube. Moreover, wind vortices may actually be enhanced from one row of tracking systems to the next. As the wind pushes on the PV modules, it applies torsion to the torque tube, tending to twist the torque tube along its main axis. Therefore, the geometry of a solar tracking system makes it vulnerable to wind conditions leading to oscillatory motion of the photovoltaic modules. While spacing support pillars more closely together can ameliorate or at least reduce the effects of wind on the torque tube, this solution comes at great cost in terms of more complicated and costly installations. Consequently, methods and apparatus for reducing the effects of wind on the torque tube of a solar tracking system without adding additional support pillars is desirable.

SUMMARY

This disclosure describes various embodiments that relate to methods and apparatus for damping oscillations on a solar-tracking photovoltaic array generated by wind interacting with photovoltaic modules.

A solar-tracking photovoltaic array is disclosed. The solar-tracking photovoltaic array includes the following: a torque tube having a first end and a second end opposite the first end; photovoltaic modules supported by the torque tube; an orientation motor mechanically coupled to the torque tube and configured to rotate the torque tube in a manner that keeps the photovoltaic modules oriented towards the sun; a sensor configured to provide data corresponding to rotation of a second end of the torque tube; a controller configured to receive the data from the sensor, determine that the data is indicative of oscillations of the torque tube, and command the orientation motor to move the torque tube to dampen the oscillation.

In many embodiments, commanding the orientation motor to move the torque tube to dampen the oscillations includes energizing the motor to move the torque tube in a series of pulses.

In many embodiments, the solar-tracking photovoltaic array also includes support columns, each of the support columns supporting the torque tube above the ground.

In many embodiments, each of the support columns includes a bearing that engages with an exterior surface of the torque tube and allows free rotation of the torque tube with respect to the support column.

In many embodiments, the bearing opposes deflection of a portion of the torque tube proximate the support column.

In many embodiments, the sensor takes the form of one or more strain gauges distributes along a length of the torque tube, the one or more strain gauges providing an amount of twist experienced by an exterior portion of the torque tube.

In many embodiments, the torque tube is a first torque tube and the solar-tracking photovoltaic array also includes a second torque tube configured to be rotated by the orientation motor.

In many embodiments, the second torque tube is coupled with photovoltaic modules separate and distinct from the photovoltaic modules coupled with the first torque tube.

A method for damping oscillations in a photovoltaic array is disclosed. The method includes at least the following: measuring changes in the angular position of a torque tube supporting one or more photovoltaic modules; determining when changes in angular position of the torque tube correspond to oscillatory motion of the torque tube; and applying pulses to the torque tube in a direction opposing the oscillatory motion to dampen the oscillatory motion in the torque tube.

In many embodiments, the pulses are applied during intervals in which the angular velocity of a portion of the torque tube changes direction.

In many embodiments, the changes in the angular position of the torque tube are measured by a sensor selected from the group consisting of an inclinometer, an accelerometer and a strain gauge.

In many embodiments, a controller in communication with the sensor determines when the changes in angular position correspond to oscillatory motion.

In many embodiments, the pulses are applied to the torque tube by a motor that is also configured to keep the photovoltaic modules oriented towards the sun.

A photovoltaic array is disclosed. The photovoltaic array includes the following: a torque tube; a plurality of photovoltaic modules distributed across and coupled to the torque tube; a motor coupled to a first end of the torque tube and configured to rotate the torque tube; a sensor configured to provide data corresponding to the angular deflection of a second end of the torque tube, the second end of the torque tube being opposite the first end of the torque tube; and a controller configured to command the motor to apply one or more pulses opposing the angular velocity of the torque tube in response to the torque tube undergoing oscillatory motion.

In many embodiments, the motor is configured to rotate the torque tube so that the plurality of photovoltaic modules stay oriented towards the sun.

In many embodiments, the sensor includes an inclinometer located at the second end of the torque tube that is configured to measure an angle of the torque tube with respect a fixed reference angle.

In many embodiments, the photovoltaic array also includes support columns supporting both the motor and the torque tube above the ground.

In many embodiments, each of the support columns includes a bearing that opposes vertical and horizontal deflection of the torque tube.

In many embodiments, one or more of the support columns includes an open bearing that allows vertical motion of the torque tube.

In many embodiments, the sensor takes the form of multiple sensors, a first one of the sensors being used to calibrate data returned by a second one of the sensors.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

This description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the invention is not limited to the embodiments shown, but is to be accorded the widest scope consistent with the principles and features disclosed herein.

Photovoltaic modules can be arranged in many different ways. For example, in some cases, arranging multiple photovoltaic modules facing in a generally upward orientation can provide long periods of time during a particular day in which the photovoltaic modules gather substantial amounts of light. When it can be anticipated which hours of the day large amounts of electricity will be consumed, the photovoltaic module can be oriented in a direction optimized for most efficient collection during those hours. However, when it is important to maximize an amount of energy collected by the photovoltaic modules, the photovoltaic modules can be positioned upon a rotating support structure with a motor configured to keep the solar panels oriented towards the sun throughout the day. Unfortunately, support structures configured to reorient the photovoltaic modules in this way are generally much more complex than a support structure designed only to secure the photovoltaic modules in a single orientation. The complexity and moving parts involved in facilitating the sun tracking can reduce the effective strength of the support structure.

One particular solar-tracking configuration that can be susceptible to wind damage is a system in which an orientation motor is configured to rotate one end of a torque tube supporting a row of solar panels. In particular, the torque tube can undergo substantial amounts of twist during times in which strong winds buffet the photovoltaic modules, which are supported and oriented by the torque tube. In general, the end of a longer torque tubes are generally subject to greater amounts of twist than a shorter torque tube on account of the stress from the twisting being generated by wind acting against a greater number of photovoltaic modules. A total amount of forces acting on the tube may be greater on a longer tube depending on the distances between ground supports. The forces applied by the wind can have multiple characteristics. The first characteristic is associated with the force imparted by the steady state wind velocity incident to the photovoltaic modules. In general, greater angles of the photovoltaic module with respect to the ground cause larger amounts of force to be imparted by the wind. This characteristic can place a large steady amount of torque on the torque tube in the direction of the prevailing wind. The second characteristic relates to dynamic forces generated by the wind that can take the form of vortex shedding. When the photovoltaic modules are angled with respect to the flow of the wind, the planar shape of the photovoltaic modules can form a wing type structure. As the wind flows past the leading and trailing edges of the photovoltaic modules, alternating low-pressure vortices are created along the surface of the photovoltaic modules facing away from the flow of wind. These low-pressure vortices can induce oscillatory motion in the photovoltaic modules. This problem becomes even more severe when the oscillatory frequency caused by the low-pressure vortices coincides with a resonant frequency of the photovoltaic modules and torque tube assembly. Powerful oscillations can cause fatigue and eventual failure of the torque tubes in some configurations.

One solution to this problem is to add a feedback control system responsible for at least periodically controlling the orientation motor responsible for orienting the photovoltaic modules. The orientation motor can apply pulses to one end of the torque tube in accordance with information gathered by a feedback control system in a manner that causes a reduction in wind-induced oscillations of the photovoltaic modules and torque tube. This technique can be especially effective at preventing the photovoltaic modules from oscillating at the resonant frequency of the system. The orientation motor can be electrically coupled to a processor or controller in receipt of inputs from one or more sensors configured to detect and characterize oscillatory motion of the torque tube. Although many different types of sensors can be utilized to identify and characterize the oscillatory motion of the torque tube, one particular sensor that could be utilized is an inclinometer. The inclinometer can be positioned at the free end of the torque tube and configured to measure a difference in the angle of the end of the torque tube with respect to the end of the torque tube mechanically coupled with the orientation motor. In this way, an amount of twist being induced in the torque tube can be measured and characterized. The twist information can then be fed back to the processor or controller, which can be configured to direct the motor to pulse the torque tube in a manner that dampens or removes the oscillatory behavior. Pulses can be directed in alternating directions to keep the photovoltaic modules generally oriented towards the sun. By keeping the photovoltaic module within about five degrees or less of the optimal angle of the sun, any efficiency losses resulting from the pulses can be minimized.

Another sensor that could be used to gather the same or similar information is a series of strain gauges distributed along the length of the torque tube. Measurement of the amount of strain being applied to each portion of the torque tube can also be used to determine oscillatory motion of the solar panel array.

In some embodiments, it can be desirable to equip the photovoltaic modules with pressure sensors to measure and characterize wind shear incident to the photovoltaic modules. Pressure sensors can be operative to help measure any prevailing wind shear effects by characterizing the wind speed. This can be important in configurations where the photovoltaic modules are highly inclined and have pressure sensors on opposing ends the photovoltaic module. The pressure sensors can then provide a differential pressure that can be correlated to wind shear incident to the photovoltaic modules. More traditional wind speed and direction sensors can also be installed proximate to the photovoltaic arrays and fed back into the controller for more precise feedback control In some embodiments, the controller can be configured to stow the photovoltaic module in an upward facing orientation when winds exceed a maximum limit for safe sun-tracking operations.

It should be appreciated that, in some embodiments, two or more of the aforementioned sensors could be used to provide more accurate or redundant data. For example, while a single inclinometer might provide better angular readings at one portion of the beam, a series of strain gauges could help characterize twist across the length of the beam. The inclinometer data could then be used to refine information collected by the strain sensor data, particularly when a strain gauge is positioned near the inclinometer.

These and other embodiments are discussed below with reference to FIGS. 1A-6D; however, those skilled in the art will readily appreciate that the detailed description given herein with respect to these figures is for explanatory purposes only and should not be construed as limiting.

Figure 1A:
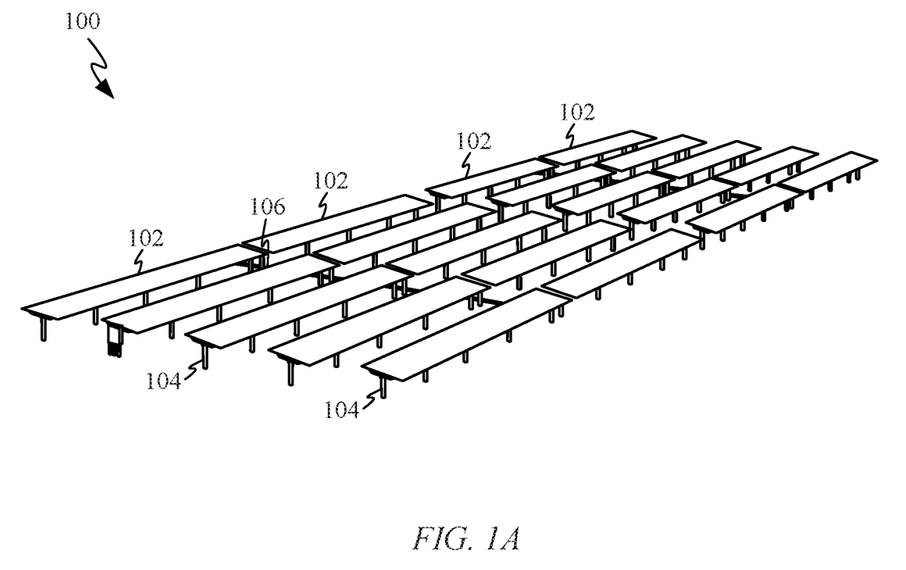
FIG. 1A shows an exemplary solar-tracking photovoltaic array.

FIG. 1A shows a photovoltaic array 100 supporting multiple photovoltaic modules 102. As depicted, photovoltaic modules 102 are supported above the ground by multiple support structures that include support columns 104. The support structures can each include components for keeping photovoltaic modules 102 oriented towards the sun. Because adjacent rows of photovoltaic modules 102 interrupt any flow of wind passing through the photovoltaic modules 102, each row of modules can experience substantially different forces from the flow of any wind passing through photovoltaic array 100. FIG. 1A also depicts electrical power lines 106 supplying power to motors configured to keep photovoltaic modules 102 oriented towards the sun. In general, the arrays of photovoltaic modules are arranged in rows oriented in a North/South direction, so that the photovoltaic modules can track the suns progress from East to West by rotating photovoltaic modules 102 about a single North-South axis of rotation.

Figure 1B:
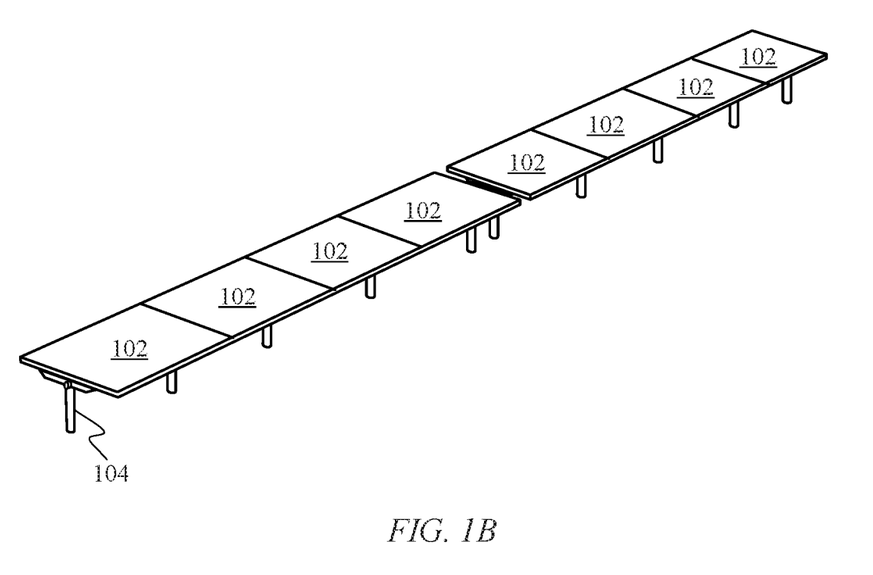
FIG. 1B shows a number of photovoltaic modules mounted on a support structure.

FIG. 1B shows a number of photovoltaic modules 102 mounted on a support structure. In particular, half of the photovoltaic modules are distributed along a first side of the support structure and the other half of the photovoltaic modules are distributed along a second side of the support structure. The first and second sides of the support structures can each take the form of a torque tube supported above the ground by multiple support columns 104. Support columns 104 can be configured to support a corresponding torque tube above the ground without restraining rotation of the torque tube. In some embodiments, the columns can include a bearing that surrounds part of all of a portion of the torque tube and allows the torque tubes free rotation of the torque tube. A motor can be positioned in the center of the support structure and coupled to one end of each torque tube. Alternatively, the torque tube could be a single structure and the motor could be located at either distal end. In this way, a single motor can be configured to control rotation of the entire tube or each end of two collinear tubes. In some embodiments, the motor can be configured to apply different forces to each torque tube. In other embodiments, the motor can be configured to rotate the torque tubes in the same or similar manners. It should be noted that in some embodiments, the photovoltaic array may be configured with multiple motors and configured to rotate about multiple axes. The control methodologies described herein can be implemented in similar manners for a system having two or more motors.

Figure 2A:
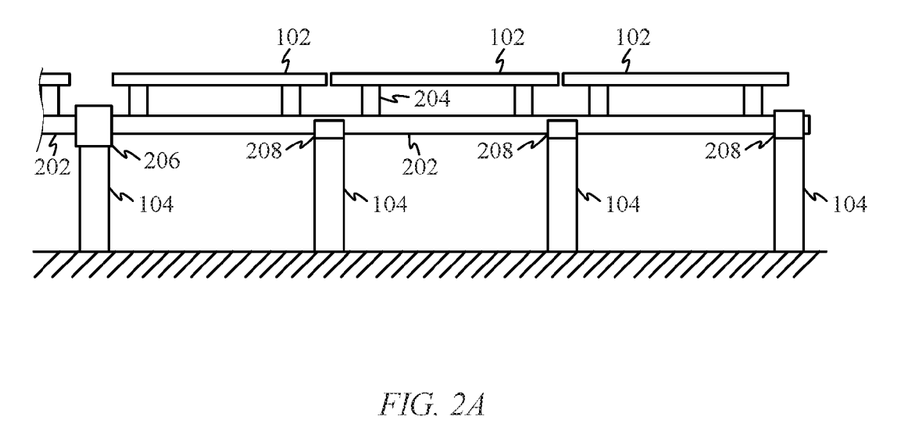
FIG. 2A shows a side view of one side of the support structure configured to support and orient photovoltaic modules.

FIG. 2A shows a side view of one side of a support structure configured to support and orient photovoltaic modules 102. FIG. 2A shows how photovoltaic modules 102 are supported above torque tubes 202 by module mounts 204. In some embodiments, photovoltaic modules 102 can be separated by small gaps. In other embodiments, a unitary photovoltaic module can stretch across one side of the support structure and be supported by each of module mounts 204. In some embodiments, photovoltaic modules 102 can be in direct contact with adjacent photovoltaic modules, or in direct contact with mounting hardware of adjacent photovoltaic modules. When photovoltaic modules 102 are arranged without gaps, turbulence caused by wind passing between photovoltaic modules 102 can be avoided. FIG. 2A also depicts orientation motor 206, which is mechanically coupled with one end of each of torque tubes 202 and configured to rotate both torque tubes 202 in a manner that keeps photovoltaic modules 102 oriented towards the sun. FIG. 2A also depicts bearings 208, which are distributed along a length of torque tube 202 and help to support the weight of torque tube 202 and photovoltaic modules 102 without preventing torque tube 202 from twisting to achieve desirable orientations for collecting sunlight. Bearings 208 can take the form of a closed circular bearing that constrains deflection of a portion of torque tube 202 in any direction or an open bearing functioning primarily to support the portion of torque tube 202 above the ground.

Figure 2B:
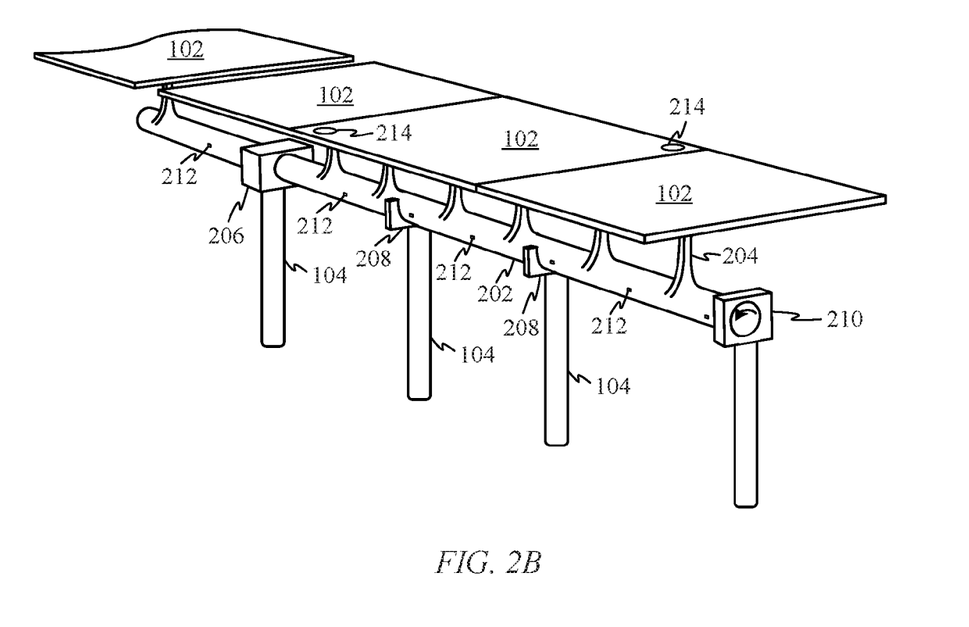
FIG. 2B depicts a perspective view of photovoltaic modules mounted atop the support structure.

FIG. 2B depicts a perspective view of photovoltaic modules mounted atop the support structure. During normal operations of photovoltaic modules 102, orientation motor 206 is utilized solely for orienting photovoltaic modules 102 towards the sun. Tracking the sun can be accomplished by rotating torque tube 202 in small increments. The increments can be determined by referencing a lookup table giving sun position data throughout the day for a known latitude and longitude. Rotation of torque tube 202 is particularly effective when torque tubes 202 are oriented in a North-South direction, thereby allowing incremental rotation of torque tube 202 to cause photovoltaic modules 102 to track the sun from East to West throughout the course of a day. When sensors mounted to the support structure and/or the photovoltaic modules detect oscillation of the torque tube, the motor can be configured to operate in accordance with a closed loop feedback control system based off of real-time position and motion data provided by the aforementioned sensor or sensors.

Figure 3:
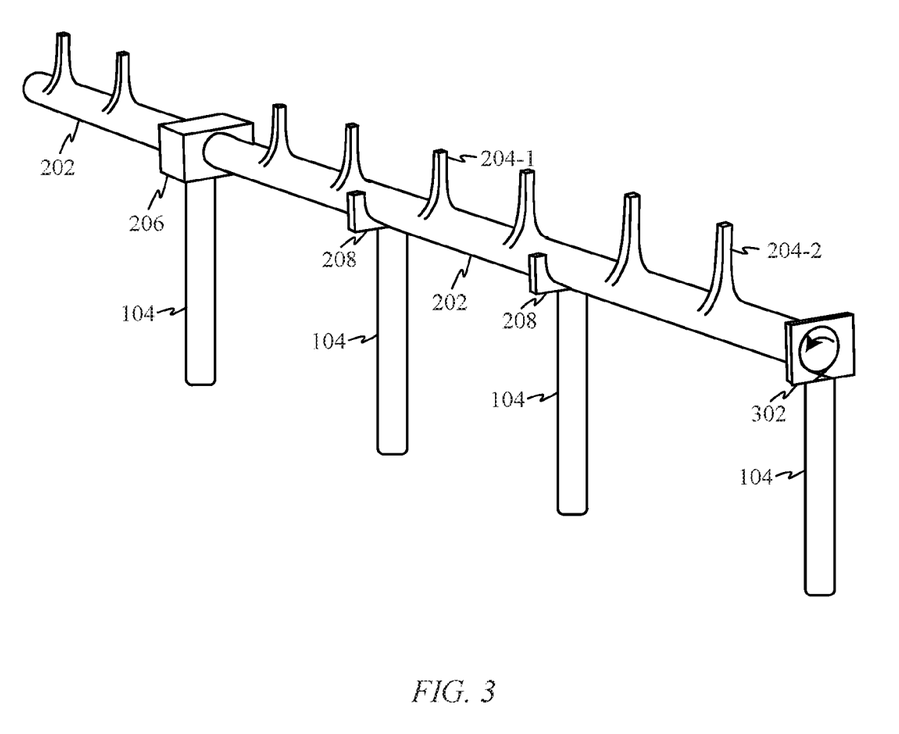
FIG. 3 depicts a torque tube of a photovoltaic array with photovoltaic modules omitted from the depiction of the torque tube.

In some embodiments, orientation motor 206 can be configured to delay operation prior to beginning counter-oscillatory inputs. The delay can be designed so that a sufficient amount of sensor data is collected before the counter-oscillatory inputs begin so that the inputs made are optimized for attenuating oscillations. The sensors can take many forms, including for example, inclinometer 210. By virtue of being arranged at a distal, unconstrained end of torque tube 202, inclinometer 210 can be best situated to measure the maximum amplitude caused by the oscillations as well as the frequency of the oscillations. In addition to, or instead of inclinometer 210, torque tube 202 can have multiple strain gauges arranged along a length of torque tube 202. The strain gauges can cooperatively measure an amount of twist being experienced by torque tube 202 at any given time. In addition to measuring the oscillations, strain gauges 212 allow more detail regarding which parts of the beam are undergoing more or less stress. Furthermore, strain gauges 212 could also be configured to identify any permanent deformation being undergone by torque tube 202 and in some cases alert an owner or operator of a need to replace the torque tube on account of imminent part failure. One or more of photovoltaic modules 102 can include various sensors for measuring oscillatory movement. In one embodiment, sensors 214 can take the form of accelerometers. Because the end portions of the panel experience the most acceleration in response to angular motion of torque tube 202, this can be an effective place for accelerometers to accurately report on oscillations of photovoltaic modules 102. In another embodiment, sensors 214 can take the form of pressure sensors configured to FIG. 3 shows a representation of torque tube 202 with photovoltaic modules 102 removed. When a free end of torque tube 202 is oscillating, each of support mounts 204 can undergo slightly different amounts of angular movement. This can result in shearing forces being applied to photovoltaic modules 102 by support mounts 204. These shearing forces can be measured in part by sensors mounted atop photovoltaic modules 102. For example, because support mount 204-1 is substantially closer to orientation motor 206 than support mount 204-2, support mount 204-2 tends to experience more rotary motion than support mount 204-1 on account of its position on torque tube 202. The increased rotary motion on support mount 204-1 can result in a shearing force being applied to photovoltaic modules 102. These shearing forces are undesirable and can be particularly harmful when multiple photovoltaic modules are rigidly coupled together. It should be noted that in addition to orientation motor 206, the photovoltaic array may include anti-oscillatory motor 302. Application of the anti-oscillatory inputs to the end of the torque tube can also be effective in damping oscillations of the torque tube. In some embodiments, anti-oscillatory motor 302 can only engage torque tube 202 periodically, while leaving it free to rotate at any other time. Another anti-oscillatory motor could be added to any of bearings 208 or even attached to orientation motor 206. In this way, the function of orientation motor 206 can be limited to solar-tracking, while the function of anti-oscillatory motor 302 can be limited to short pulses for reducing oscillations. This type of configuration could allow the motors to be optimized for particular types of movement. In such an embodiment, the only input to the anti-oscillatory motor could be the inclination or orientation sensors associated with the photovoltaic modules and/or torque tube.

Figure 4A:
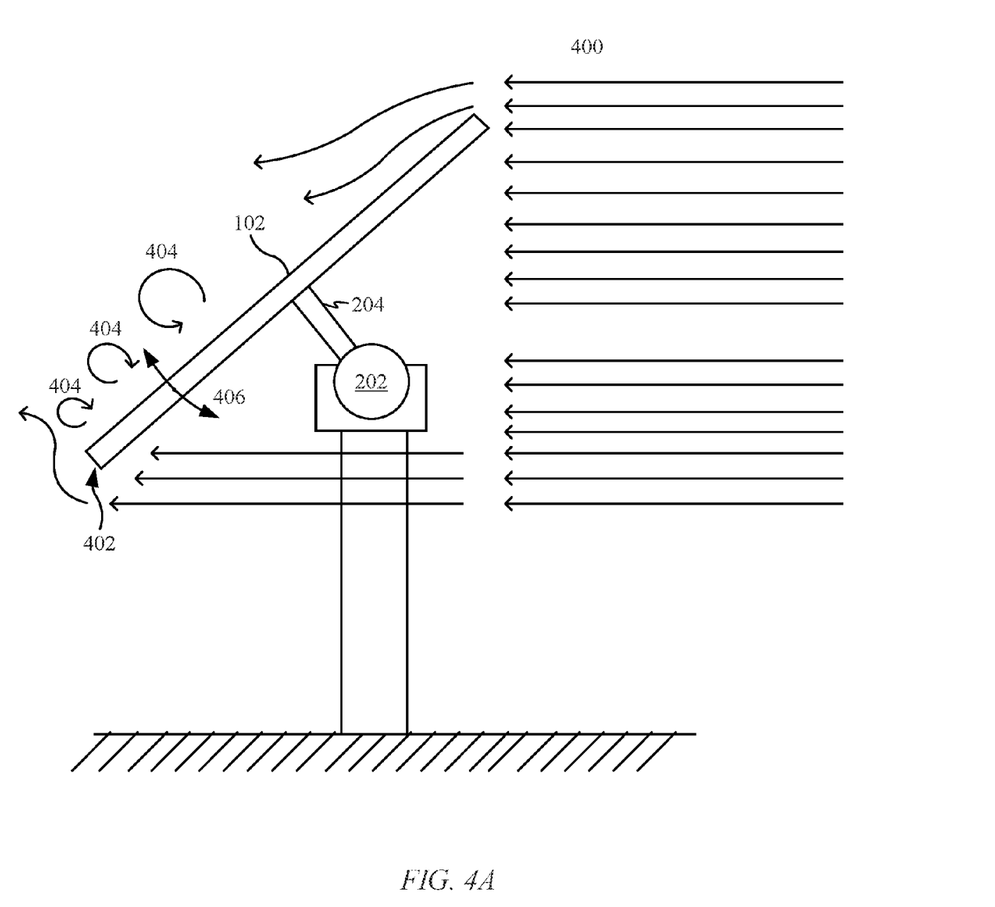
FIGS. 4A-4C show cross-sectional side views of a wind profile passing over and around a photovoltaic module mounted on a torque tube.
Figure 4B:
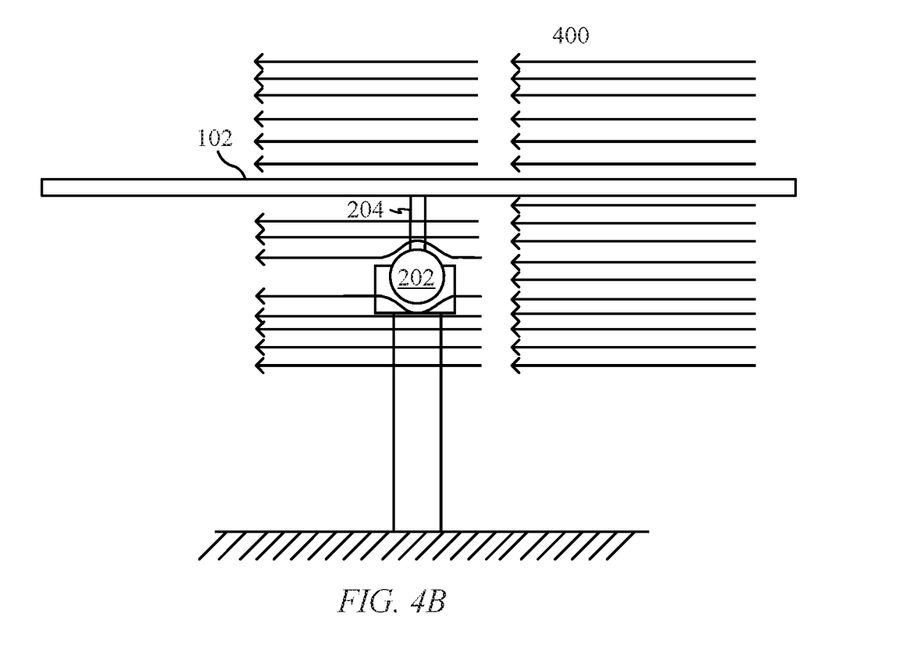
Figure 4C:
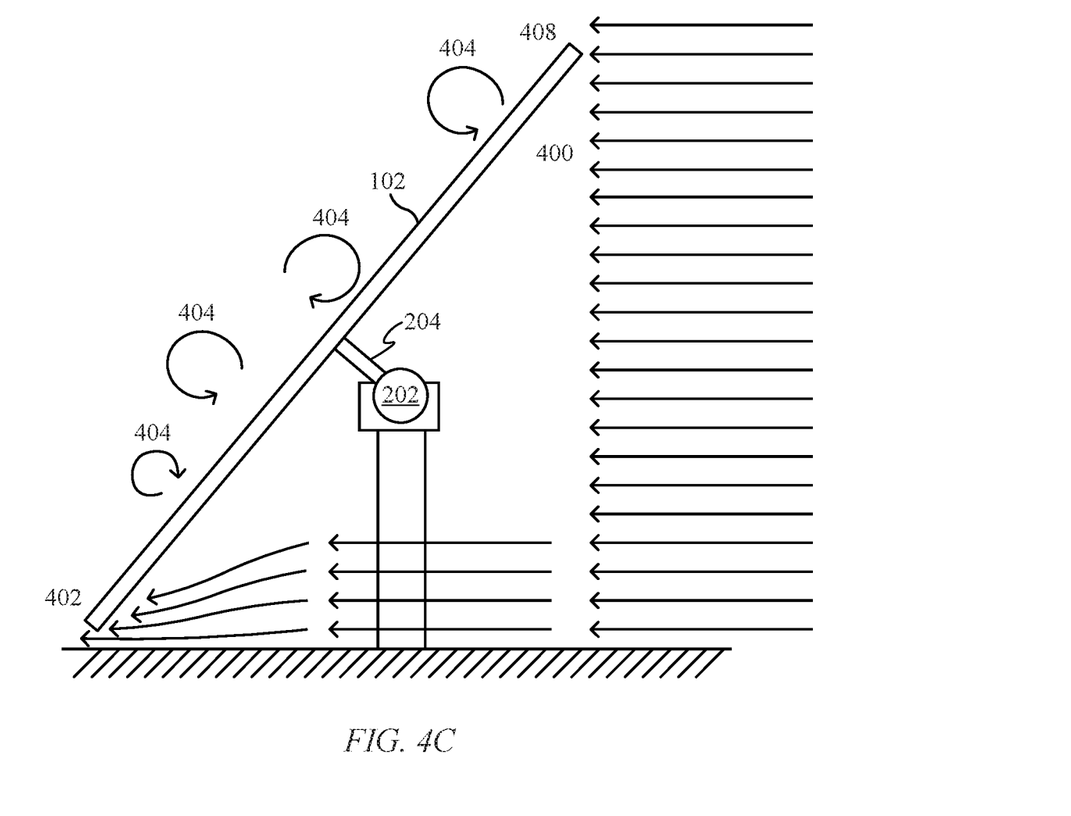

FIGS. 4A-4C show cross-sectional side views of a wind profile 400 passing over and around photovoltaic module 102 mounted on torque tube 202. In FIG. 4A, airflow 400 is shown flowing around a lower end 402 of photovoltaic module 102 that is oriented at about a 45-degree angle with respect to wind profile 400. The lower end 402 of photovoltaic module 102 tends to generate vortices 404 forming on a face of photovoltaic module 102 oriented away from the flow of the wind. This flow separation is influenced by the angle of photovoltaic module 102 with respect to the wind flow. Generally, greater angles will cause increased amounts of flow separation and vortices 404. Oscillation vector 406 shows how photovoltaic module 102 can oscillate with respect to torque tube 202. As described with respect to FIG. 3, oscillations will tend to have a greater amplitude at locations farther away from orientation motor 206.

FIG. 4B shows photovoltaic module 102 in the stowed position as airflow 400 passes smoothly around photovoltaic modules 102 on account of photovoltaic modules being aligned with airflow 400. This configuration results in little or no turbulence in the flow of air around photovoltaic modules 102. For this reason, this stowed position can be utilized for reducing the effect of wind on photovoltaic modules 102 in severe wind conditions. This upward-facing position can also be suitable for gathering solar energy over substantial portions of the day.

FIG. 4C shows photovoltaic modules 102 at its maximum deflection angle. This angle can be suitable for collecting sunlight during dawn or sunset time periods. In some embodiments, lower end 402 of photovoltaic module 102 can extend down to a position where it is only 18 inches off the ground, while top end 408 can extend up to seven feet off the ground. The narrow gap between lower end 402 and the ground can exacerbate the pressure drop and vortices generated on the back side of photovoltaic modules 102. For this reason, any anti-oscillatory inputs generated by orientation motor 206 can require greater amplitudes and be carried out with greater frequency to account for the oscillatory motion generated by the turbulent flow past photovoltaic modules 102. In some embodiments, an angle between the maximum deflection angle and stowed position can be most likely to result in harmonic oscillation of photovoltaic module 102. When such an angle is well known, orientation motor 206 can be configured to shift photovoltaic modules 102 away from the angle most likely to generate oscillatory motion. For example, where 60 degrees causes the greatest likelihood of harmonic oscillation, orientation motor 206 can be configured to rotate torque tube 202 from 55 degrees to 65 degrees (i.e. five degrees above or below the problematic angle). An amount of standoff between the harmonic oscillation angle and the operating angle of the photovoltaic modules can depend on characteristics of the system. For example, in some embodiments, likelihood of harmonic oscillation reduces drastically at 61 and 63 degrees while in other embodiments, a five-degree standoff is necessary to have a corresponding reduction in the likelihood of harmonic oscillation.

Figure 5:
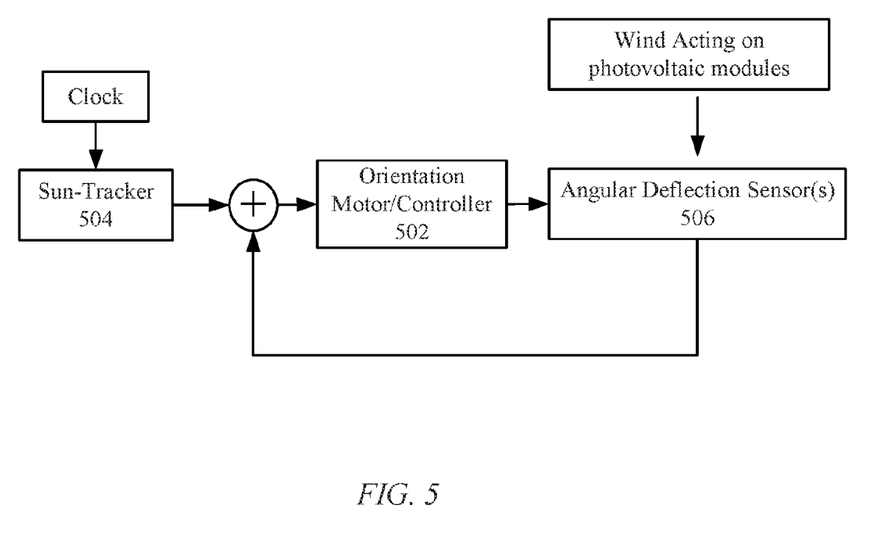
FIG. 5 shows a block diagram depicting a feedback control configuration suitable for controlling angular forces applied by an orientation motor.

FIG. 5 shows a block diagram depicting a feedback control configuration suitable for controlling angular forces applied by orientation motor 502. Normal operation of orientation motor 502 can be driven primarily by solar-tracking input 504. Solar-tracking input 504 can command orientation motor 502 to orient photovoltaic modules at an angle corresponding to the position of the sun in the sky. In some embodiments, solar-tracking input 504 can base its output on readings from a clock. In cooperation with a lookup table that correlates sun angle with time over a particular period of time, solar-tracking input 504 can command orientation motor 502 to accurately orient photovoltaic modules towards the sun. While the clock is one method of sun tracking, different tracking methodologies are equally compatible and contemplated within the scope of this disclosure. For example, an optical tracker could be used to track sun angle. In some embodiments, a light intensity meter could be used to determine an angle at which light output is greatest. Regardless of the method, sun-tracker 504 commands orientation motor 502 to an angle most conducive for collecting solar radiation.

This arrangement wouldn't require a feedback system but for the presence of substantial winds that act upon and rotate the torque tube being driven by orientation motor 502. To account for this wind-induced rotation, angular deflection sensors 506 can be arranged to measure in real-time the angular position of the torque tube in real time. The difference between the angle requested by sun-tracker 504 and angular deflection sensor(s) 506 can be used to input a correction input. While this image is drawn as a traditional feedback loop it should be understood that the feedback control may not be carried out in a traditional manner. In some embodiments, the feedback control system can wait to initiate or alternatively enter a counter-oscillatory motion mode when oscillatory motion is detected. Instead of trying to chase the desired solar-tracking angle, orientation motor 502 can be configured to instead emit pulses while the direction of motion of the photovoltaic modules are changing directions, in this way the pulses can be applied in a direction that tends to dampen out the oscillations. In this way, orientation motor 502 can be configured to effectively dampen any oscillations generated by the wind. It should be noted that the pulses and/or repositioning of orientation motor 502 may be limited so that photovoltaic modules can stay substantially oriented towards the sun. In some embodiments, orientation motor 502 could be configured to keep the photovoltaic modules within 5 degrees of the position of the sun.

Figure 6A:
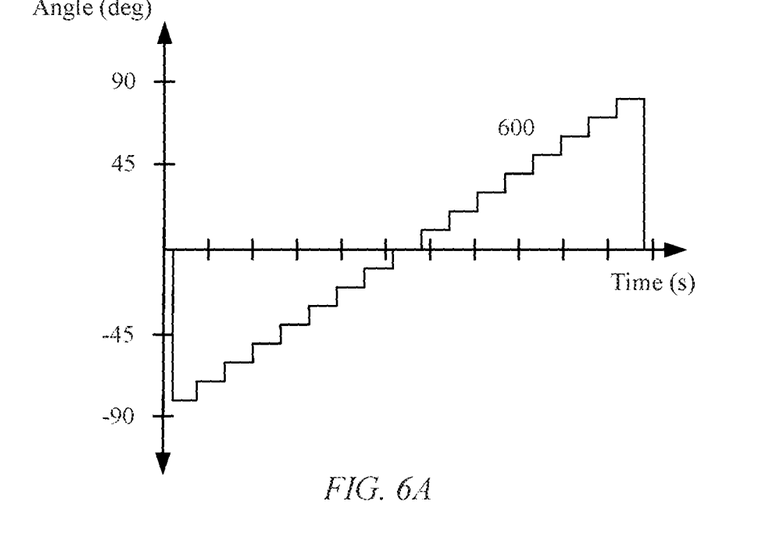
FIG. 6A shows a graph having a line representing an angular position of a distal end of a torque tube supporting photovoltaic modules of a photovoltaic array over the period of a day.

FIG. 6A shows a graph including a line 600 representing an angular position of a distal end of a torque tube over the period of a day subjected to little or no wind. The left side of the graph represents sunrise and the right side represents sunset An angle of zero degrees represents the photovoltaic modules being oriented directly upwards. An angle of about −80 degrees represents an angle optimized for collecting sunlight during sunrise and an angle of about 80 degrees represents an angle optimized for collecting sunlight during sunset. It should be noted these angles can vary based upon how close the photovoltaic modules are packed. As depicted, an orientation of the photovoltaic modules can be set by the orientation motor to an angle of zero degrees to reduce any surface level winds from buffeting the photovoltaic modules during evening hours. FIG. 6A shows how during daylight hours the orientation motor can step from one angle to another to keep the photovoltaic modules pointed towards the current position of the sun in the sky. Step sizes can be larger and less frequent or smaller and more frequent. In some embodiments, the orientation motor can be configured to rotate the torque tube continuously to achieve even higher accuracy tracking.

Figure 6B:
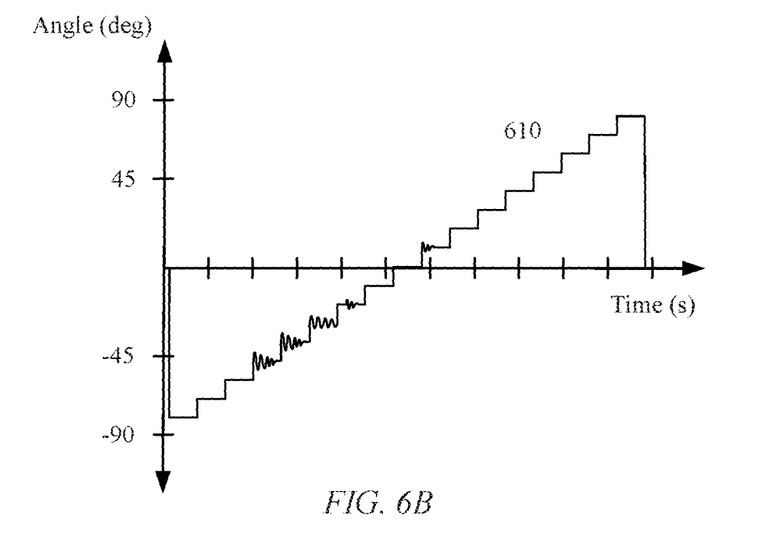
FIG. 6B shows a graph having a line representing an angular position of a distal end of a torque tube supporting photovoltaic modules of a photovoltaic array over the period of a day.

FIG. 6B shows a graph including a line 610 representing an angular position of a distal end of a torque tube as it undergoes oscillatory motion over the period of a day. The oscillatory motion can develop on account of wind buffeting the photovoltaic modules making up the photovoltaic array. The oscillations shown in FIG. 6B show modulations of the angular position of the distal end of the torque tube that are being attenuated by pulses generated by the orientation motor. In particular, line 610 shows the modulations being damped in various ways as a result of inputs generated by the orientation motor.

Figure 6C:
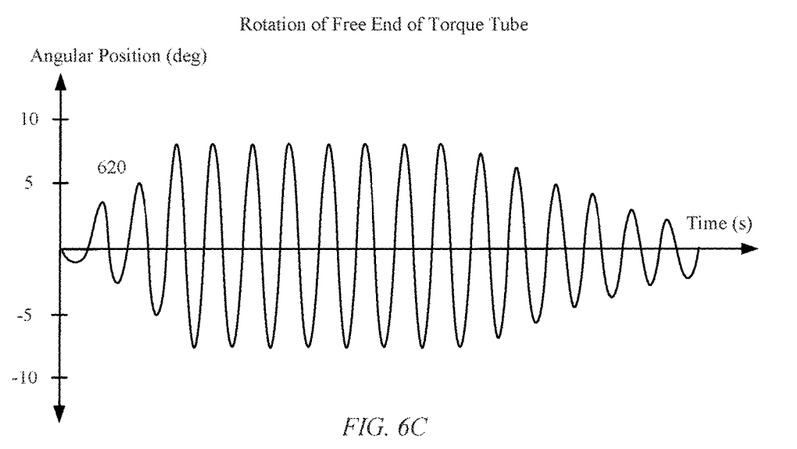
FIGS. 6C-6D show graphs depicting the angular position of each end of a torque tube during oscillation of the torque tube.
Figure 6D:
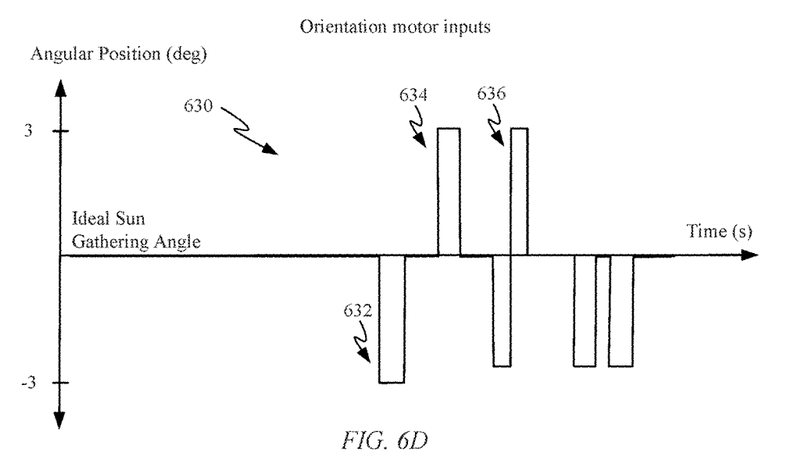

FIGS. 6C-6D shows lines 620 and 630, which depict the angular position of each end of a torque tube during oscillation of the torque tube. In particular, FIG. 6C represents angular movement of a free end of the torque tube and FIG. 6D shows pulses made by an orientation motor relative to the commanded position of the photovoltaic array. As depicted, the anti-oscillatory inputs depicted in FIG. 6D and made by the orientation motor are timed to coincide with maximums of the oscillatory motion of the distal end of the torque tube. In particular, input 632 includes a three degree pulse in a first direction as the oscillatory motion in FIG. 6C approaches negative seven degrees and then after a delay a three degree pulse to return to the original angular position in a second direction opposite the first direction as the oscillatory motion approaches seven degrees. In this way, the oscillatory motion of the distal end of the torque tube can be efficiently dissipated. By varying a direction of the pulses back and forth the photovoltaic modules can remain close to the desired sunlight-gathering angle. It should be noted that input 632 may be delayed so that the processor or controller has time to characterize the oscillatory motion. This delay can help the controller identify any patterns in the oscillatory motion so that the anti-oscillatory pulses can be applied efficiently, thereby allowing any effects on power collection to be minimized. It should be noted that the oscillatory motion of the torque tube may not be considered severe enough to counter until one or more of the oscillations exceeds a predetermined threshold. For example, five consecutive oscillations of 5 degrees or more could constitute a lower end threshold.

Keeping the pulses at the small magnitudes depicted in FIG. 6D can be helpful in avoiding reductions in power collection efficiency. It should also be noted that the pulses can be applied in different directions. For example, input 634 begins with a pulse in the opposite direction of the first pulse of input 632. Input 636 shows how by stacking inputs closer together, pulse size can be increased to 6 degrees by moving from −3 degrees to +3 degrees, without exceeding a three-degree offset from the desired orientation angle. It should be noted that the three-degree pulse magnitude is given for exemplary purposes only and that larger or smaller pulse magnitudes can also be applied.

The various aspects, embodiments, implementations or features of the described embodiments can be used separately or in any combination.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A solar-tracking photovoltaic array, comprising:
 a torque tube having a first end and a second end opposite the first end;
 a plurality of photovoltaic modules supported by the torque tube;
 an orientation motor mechanically coupled to the torque tube and configured to rotate the torque tube in a manner that keeps the plurality of photovoltaic modules oriented towards the sun;
 a sensor configured to provide data corresponding to angular rotation of the second end of the torque tube;
 a controller that in response to receiving data from the sensor indicative of oscillations of the torque tube commands the orientation motor to move the torque tube to dampen the oscillations.

2. The solar-tracking photovoltaic array of claim 1, wherein commanding the orientation motor to move the torque tube to dampen the oscillations comprises energizing the orientation motor to move the torque tube in a series of pulses.

3. The solar-tracking photovoltaic array of claim 1, further comprising:
 a plurality of support columns, each of the plurality of support columns supporting the torque tube above the ground.

4. The solar-tracking photovoltaic array of claim 3, wherein each of the plurality of support columns includes a bearing that engages the torque tube and allows free rotation of the torque tube with respect to a corresponding on of the plurality of support columns.

5. The solar-tracking photovoltaic array of claim 4, wherein the bearing opposes deflection of a portion of the torque tube proximate the support column.

6. The solar-tracking photovoltaic array of claim 1, wherein the sensor comprises one or more strain gauges distributed along a length of the torque tube, the one or more strain gauges detecting an amount of twist experienced by an exterior portion of the torque tube.

7. The solar-tracking photovoltaic array of claim 1, wherein the torque tube is a first torque tube and wherein the solar-tracking photovoltaic array further comprises a second torque tube configured to be rotated by the orientation motor.

8. The solar-tracking photovoltaic array of claim 7, wherein the second torque tube is coupled with a plurality of photovoltaic modules separate and distinct from the photovoltaic modules supported by the first torque tube.

* * * * *